(12) United States Patent
Makanawala (10) Patent No.: US 11,117,484 B2
(45) Date of Patent: Sep. 14, 2021

(54) SAFE AND SECURE CHARGING OF A VEHICLE

(71) Applicant: Byton Limited, Hong Kong (HK)

(72) Inventor: Tejesh Makanawala, Mountain View, CA (US)

(73) Assignee: Byton Limited, Hong Kong (HK)

( * ) Notice: Subject to any disclaimer, the term of this patent is extended or adjusted under 35 U.S.C. 154(b) by 161 days.

(21) Appl. No.: 15/975,737

(22) Filed: May 9, 2018

(65) Prior Publication Data

US 2019/0344669 A1   Nov. 14, 2019

(51) Int. Cl.
*B60L 53/60* (2019.01)
*H01M 10/42* (2006.01)
*H02J 7/00* (2006.01)

(52) U.S. Cl.
CPC ........... *B60L 53/60* (2019.02); *H01M 10/425* (2013.01); *H02J 7/0029* (2013.01); *B60L 2270/36* (2013.01); *B60L 2270/38* (2013.01); *H01M 2010/4271* (2013.01)

(58) Field of Classification Search
CPC ..................................... B60K 53/60
USPC ........................................ 701/22
See application file for complete search history.

(56) References Cited

U.S. PATENT DOCUMENTS

| | | | | |
|---|---|---|---|---|
| 8,519,839 | B2 * | 8/2013 | Mituta, V ............ | G08B 21/185 340/455 |
| 8,816,815 | B2 * | 8/2014 | Kuramochi ............. | B60L 50/16 340/5.64 |
| 2009/0018716 | A1 * | 1/2009 | Ambrosio ............... | B60L 58/20 701/22 |
| 2010/0161481 | A1 * | 6/2010 | Littrell ................... | B60L 53/64 705/40 |
| 2010/0250043 | A1 * | 9/2010 | Scheucher ............. | B60L 53/11 701/22 |
| 2011/0246014 | A1 * | 10/2011 | Sauper ................... | B60L 53/30 701/22 |
| 2013/0166123 | A1 * | 6/2013 | Donald, III ............ | B60L 58/12 701/22 |
| 2013/0179061 | A1 * | 7/2013 | Gadh ...................... | B60L 53/51 701/123 |

(Continued)

FOREIGN PATENT DOCUMENTS

| CN | 101740837 A | 6/2010 |
|---|---|---|
| CN | 105050868 A | 11/2015 |

(Continued)

OTHER PUBLICATIONS

Chinese Office Action for application No. 201811327119.4, dated Jun. 1, 2020, 11 pages.

*Primary Examiner* — Jean Paul Cass (74) *Attorney, Agent, or Firm* — Womble Bond Dickinson (US) LLP (57) ABSTRACT

Safe and secure charging of a vehicle is disclosed. For one embodiment, a system monitors data communicated over a communications network of the motor vehicle. The system determines a current charging stage from a number of predetermined charging stages for the motor vehicle. The system analyzes the monitored data based on the determined current charging stage for an unexpected message. The system detects an unexpected message in the monitored data and performs a corrective action based on the detecting of the unexpected message.

16 Claims, 5 Drawing Sheets

(56) References Cited

U.S. PATENT DOCUMENTS

| | | | | |
|---|---|---|---|---|
| 2013/0204473 A1* | 8/2013 | Then | .................. | B60L 53/60 |
| | | | | 701/22 |
| 2013/0338865 A1* | 12/2013 | Kryze | .................. | B60L 53/66 |
| | | | | 701/22 |
| 2015/0149221 A1* | 5/2015 | Tremblay | .............. | G06Q 10/02 |
| | | | | 705/5 |
| 2016/0082943 A1* | 3/2016 | Kodawara | ............. | B60W 20/13 |
| | | | | 701/22 |
| 2016/0082946 A1* | 3/2016 | Kodawara | ............. | B60L 50/16 |
| | | | | 701/22 |
| 2016/0090080 A1* | 3/2016 | Kodawara | ............. | B60L 53/14 |
| | | | | 701/22 |
| 2016/0107635 A1* | 4/2016 | Kodawara | ............. | B60W 20/00 |
| | | | | 701/22 |
| 2016/0114692 A1* | 4/2016 | Tripathi | ............... | B60L 3/0046 |
| | | | | 320/109 |
| 2016/0121198 A1* | 5/2016 | Doerksen | ............... | B60L 50/52 |
| | | | | 701/22 |
| 2016/0200211 A1* | 7/2016 | Gibeau | .................. | B60L 53/63 |
| | | | | 701/22 |
| 2016/0317341 A1* | 11/2016 | Galvan | .................. | A61F 5/028 |
| 2017/0149820 A1* | 5/2017 | Ruvio | ................ | H04L 63/1441 |
| 2017/0297431 A1* | 10/2017 | Epstein | .................... | F01P 5/10 |
| 2017/0355274 A1* | 12/2017 | Ger | ........................ | B60L 50/15 |
| 2018/0035606 A1* | 2/2018 | Burdoucci | ............ | A01D 43/14 |
| 2019/0268743 A1* | 8/2019 | Cho | ...................... | G09F 21/042 |
| 2019/0303822 A1* | 10/2019 | Spoon | ................ | G06Q 10/0635 |

FOREIGN PATENT DOCUMENTS

| | | | | |
|---|---|---|---|---|
| KR | 101025121 B1 * | 9/2006 | | |
| WO | WO-2012095225 A1 * | 7/2012 | .............. | B60L 53/65 |

* cited by examiner

SAFE AND SECURE CHARGING OF A VEHICLE

FIELD

The disclosed embodiments relate generally to vehicle systems and in particular, but not exclusively, to secure a charging of a vehicle.

BACKGROUND

Typical charging for a vehicle involves a direct connection between a battery management system (BMS) or a vehicle control unit (VCU) and an external charger such as a charging station to establish a communication channel to communicate a charging state of the battery to the external charger. Having the direct connection to the BMS or VCU however raises security vulnerabilities for the vehicle as data exchanged between the external charger and the motor vehicle may not be benign. For example, malicious traffic may be purposefully introduced into the motor vehicle via the established communication channel. Or inadvertent attempts may be made to cause a non-allowed action (e.g., access encrypted data), to misconfigure a motor vehicle system (e.g., set a component operating parameter outside of an acceptable range), or to lead to any other action that could damage or impact operations of the vehicles.

SUMMARY

Embodiments are disclosed for enforcing a safe secure charging of a vehicle. For one embodiment, a system monitors data communicated over a communications network of the motor vehicle. The system determines a current charging stage from a number of predetermined charging stages for the motor vehicle. The system analyzes the monitored data based on the determined current charging stage for an unexpected message. The system detects an unexpected message in the monitored data and performs a corrective action based on the detecting of the unexpected message.

DETAILED DESCRIPTION

Safe and secure direct current (DC) and/or alternating current (AC) charging is described in detail below. For one embodiment, a direct communication channel is established between a vehicle charging station and a vehicle gateway via a controller area network (CAN) bus. For another embodiment, an indirect communication channel is established between the vehicle charging station and the vehicle gateway via a central data intelligence unit (CDI) (or a vehicle control unit (VCU)). The vehicle gateway can monitor CAN data on the communication channel and can provide an authorization key (or a secure key) to allow or inhibit a charging. The vehicle gateway can also block unauthorized access to the vehicle via the communication channel.

Figure 1:
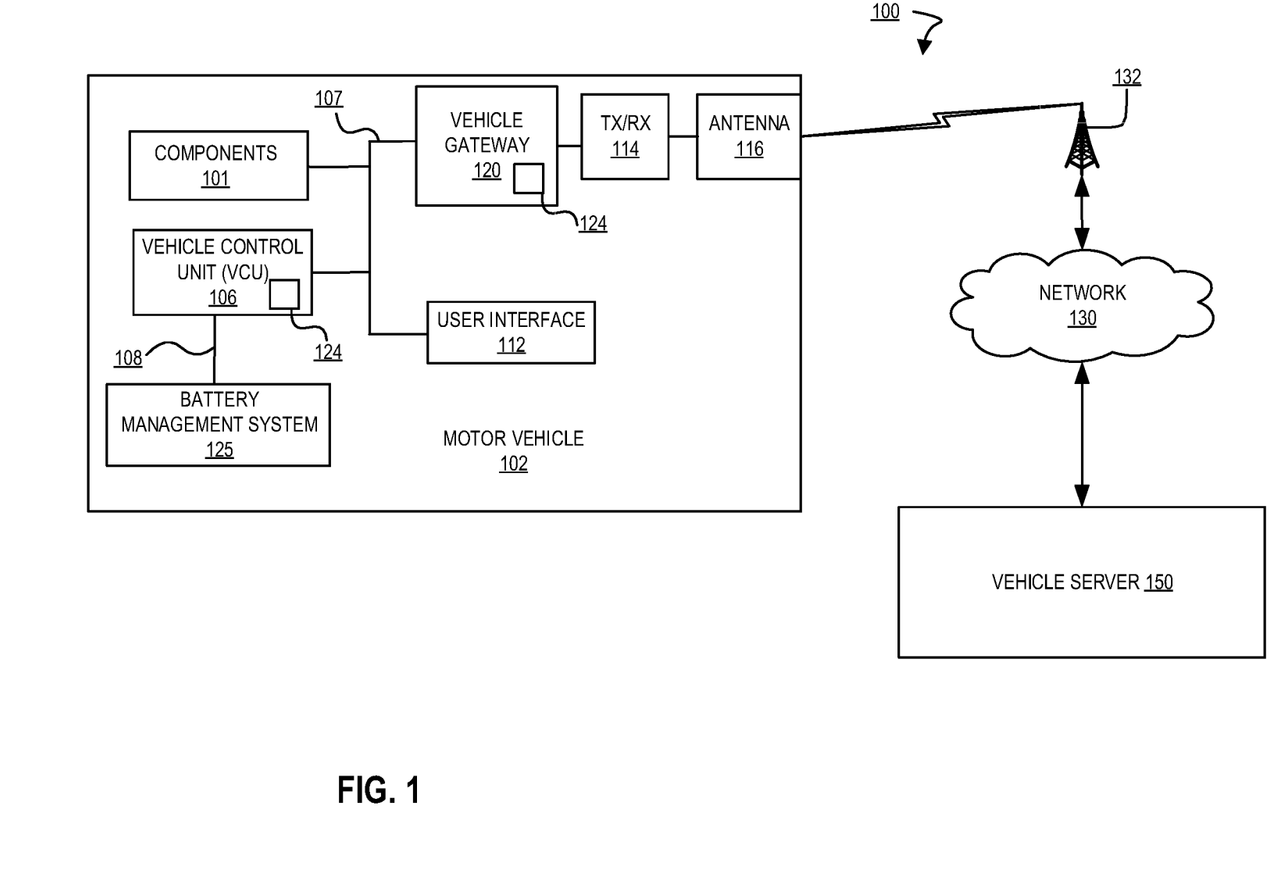
FIG. 1 is a block diagram of an exemplary system architecture for a motor vehicle and a security server.

FIG. 1 is a block diagram for an example of a system architecture 100 for a motor vehicle. For some embodiments, motor vehicle 102 may a fully electric vehicle, a partially electric (i.e., hybrid) vehicle, or a non-electric vehicle (i.e., vehicle with a traditional internal combustion engine) having a battery management system. Furthermore, although described mostly in the context of automobiles, including sport utility vehicles (SUV), the illustrated systems and methods can also be used in other wheeled vehicles such as trucks, motorcycles, buses, trains, etc. It can also be used in non-wheeled vehicles such as ships and airplanes. In fact, the illustrated embodiments can be used in any situation in which it is useful to ensure a safe charging of the vehicles in connection with a charger.

For one embodiment, motor vehicle 102 includes battery management system (BMS) 125, components 101, vehicle control unit (VCU) 106, user interface 112, and vehicle gateway 120. Vehicle gateway 120 and/or VCU 106 can include secure charging module 124. Secure charging module 124 can provide a safe and secure DC and/or AC charging process as described further below. BMS 125 can manage a battery system for the motor vehicle 102. BMS can be communicatively coupled to vehicle control unit (VCU) 106 via communications network 108. Vehicle control unit (VCU) 106 can be a controller that includes a microprocessor, memory, storage, and a communication interface with which it can communicate with various systems such as components 101 and vehicle gateway 120 via network 107. Components 101 may be generally components of the motor vehicle 102. For example, components 101 can include adjustable seat actuators, power inverters, window controls, electronic braking systems, etc.

For one embodiment, VCU 106 can communicate with BMS 125 via network 108 or user interface 112 via network 107. For one embodiment VCU 106 is the vehicle's main computer, but in other embodiments it can be a component separate from the vehicle's main or primary computer. For one embodiment, vehicle gateway 120 and VCU 106 may be an integrated component.

Communications networks 107 and 108 may be a controller area network (CAN) bus, an Ethernet network, a wireless communications network, another type of communications network, or a combination of different communication networks. For one embodiment, communication network 107 is an Ethernet network and communication network 108 is a CAN bus. For one embodiment, vehicle gateway 120 is communicatively coupled to transceiver 114, which is communicatively coupled to antenna 116, through which motor vehicle 102 can wirelessly transmit data to, and receive data from, vehicle server 150. Referring to FIG. 1, motor vehicle 102 can communicate wirelessly via antenna 116 with tower 132, which can then communicate via network 130 (e.g., a cellular communication network, a local area network, a wide area network, etc.) with vehicle server 150.

Although only one motor vehicle 102 is shown, in other embodiments many more motor vehicles can be connected to vehicle server 150. Furthermore, vehicle server 150 may be comprised of two or more server computer systems distributed over network 130.

Vehicle server 150 is communicatively coupled to network 130, so that vehicle server 150 can exchange data with motor vehicle 102, as well as to exchange information with other systems. For example, vehicle server 150 may schedule, notify, or consult with other systems, such as notifying a charging station of a charging stage or a battery status of motor vehicle 102 via network 130. Although illustrated as a single server, in other embodiment's server 150 can include multiple servers, each of which includes one or more microprocessors, memory, and storage.

For some embodiments, vehicle gateway 120 and/or VCU 106 may be a hardened hardware appliance. For some embodiments, vehicle gateway 120 and/or VCU 106 may implement one or more physical and logical barriers to prevent external systems from accessing and/or controlling secure charging module 124. For another embodiment, secure charging module 124 includes one or more software components that can detect intrusions for a communication network, such as attempts to access a secure storage, to reprogram, or to otherwise tamper with an operation of secure charging module 124. As a hardened appliance, in response to detecting an intrusion, secure charging module 124 can respond by taking one or more actions (e.g., directing other systems, e.g., VCU to stop an activity (e.g., charging), shutting down, entering a safe mode, wiping storage, and/or loading a clean configuration, etc.).

Figure 2:
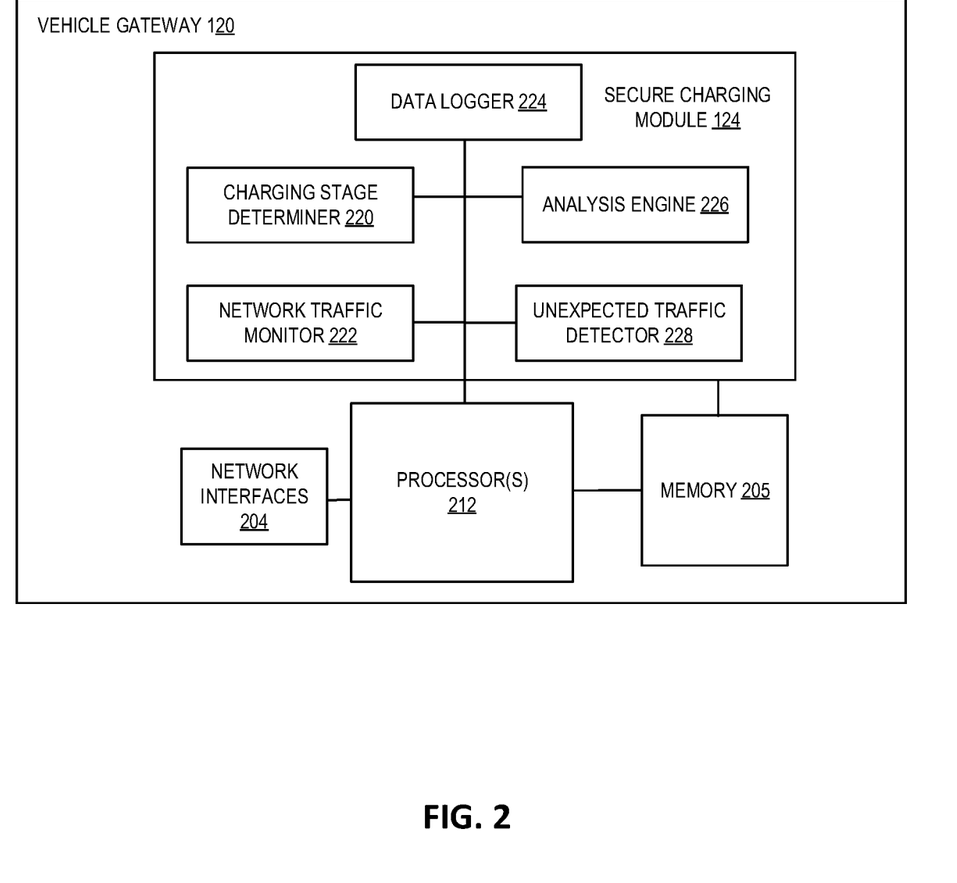
FIG. 2 is block diagram of one embodiment of a vehicle gateway.

FIG. 2 is block diagram of an example of a vehicle gateway 120 according to one embodiment. Referring to FIG. 2, for one embodiment, vehicle gateway 120 includes one or more processor(s) 212, memory 205, and network interfaces 204. Network interfaces 204 may communicatively couple motor vehicle 102 to any number of wireless subsystems (e.g., Bluetooth, WiFi, Cellular, or other networks), internal motor vehicle communication networks (e.g., a CAN bus, an Ethernet network, a wireless network, etc.) to transmit and receive data streams through one or more communication links.

Memory 205 may be coupled to processor(s) 212 to store instructions for execution by processor(s) 212. For some embodiments, memory 205 is non-transitory, and may store one or more processing modules of vehicle gateway 120, such as secure charging module 124. Secure charging module 124 can serve to provide a safe and secure DC and/or AC charging. Secure charging module 124 can include charging stage determiner 220, network traffic monitor 222, data logger 224, analysis engine 226, and unexpected traffic detector 228. Charging stage determiner 220 can determine a current charging stage of the motor vehicle via a VCU (such as VCU 106 of FIG. 1) and/or a BMS (such as BMS 125 of FIG. 1). Network traffic monitor 222 can monitor data traffic for a communication channel and/or network. Data logger 224 can log data packets for the monitored communication channel and/or network. Analysis engine 226 can analyze the logged data packets for intrusive data packets and/or unexpected communication messages. Unexpected traffic detector 228 can detect an unexpected message based on the analysis from analysis engine 226.

Figure 3:
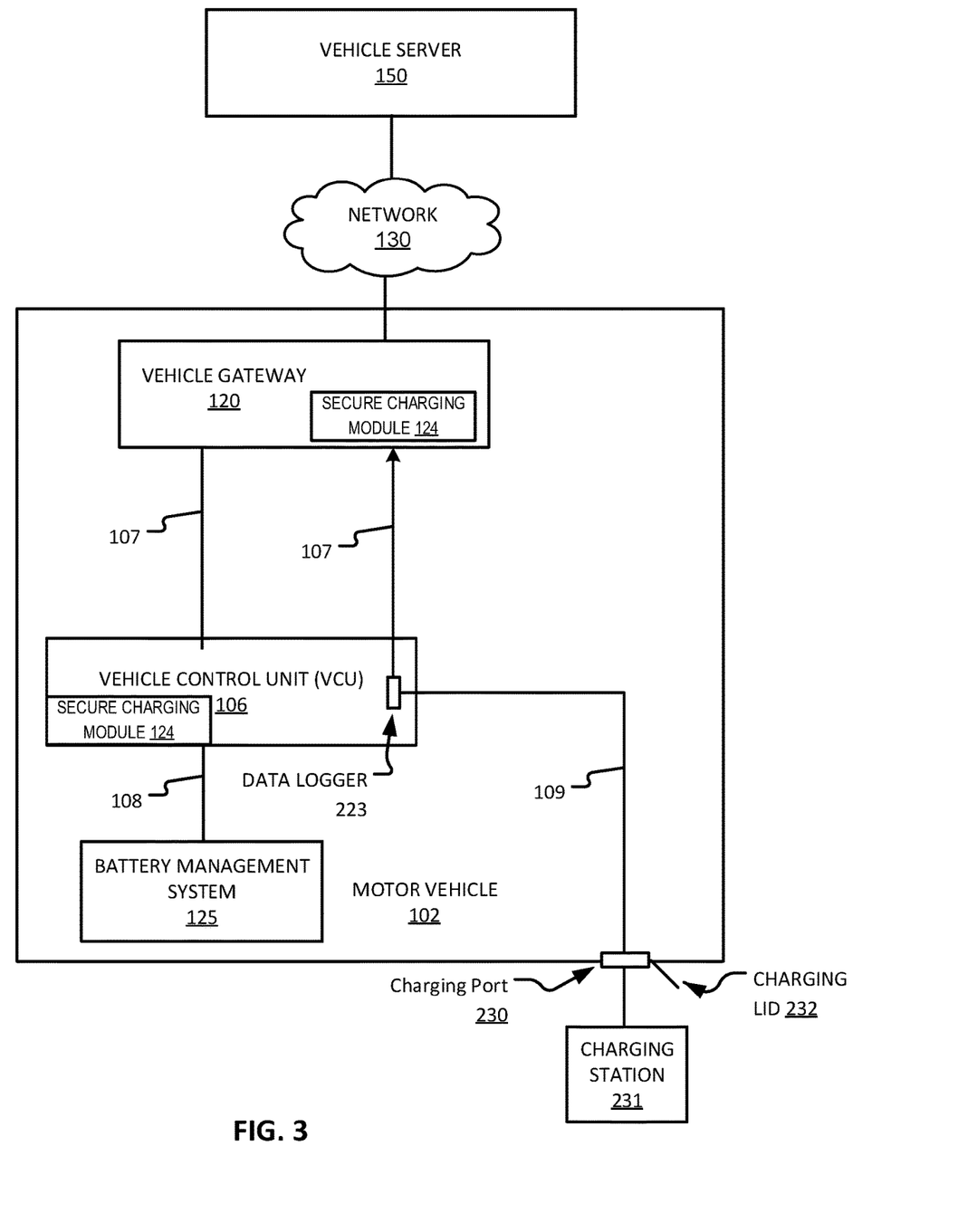
FIG. 3 is block diagram of one embodiment of a motor vehicle in communication with a charger.

FIG. 3 is block diagram of one embodiment of a motor vehicle in communication with a charging station. Referring to FIG. 3, for one embodiment, motor vehicle 102 can include a charging port 230, mechanical charging lid 232, and communication channel 109. Mechanical charging lid 232 can be a lid covering charging port 230 of motor vehicle 102. Mechanical charging lid 232 can be unlocked with a wireless key entry device (not shown) as a safety mechanism to prevent unauthorized access to charging port 230 of motor vehicle 102. Charging port 230 can be a power charging port as well as an external communication interface for charging station 231 to communicate with motor vehicle 102 via communication channel (or network) 109. Communication channel 109 can be a dedicated communication channel for charging station 231 to communicate with VCU 106 via charging port 230. For one embodiment, communication channel 109 is a CAN bus. For one embodiment, VCU 106 includes data logger 223 to log any communication through communication channel 109. In another embodiment, data logged by data logger 223 can be redirected to vehicle gateway 120 for a secure charging module, such as secure charging module 124 of vehicle gateway 120 to analyze the data and to detect a data intrusion. For one embodiment, data logged by data logger 223 is analyzed by secure charging module 124 of VCU 106 to detect the data intrusion. In this case, VCU 106 can isolate charging subsystems (e.g. BMS 125 and communication network 109) of the vehicle from other vehicle operations. For one embodiment, upon detection of a data intrusion, secure charging module 124 of gateway 120 and/or VCU 106 may perform a corrective action based on the detected data intrusion.

For one embodiment, secure charging module 124 of vehicle gateway 120 may send the logged communication data to vehicle server 150 via network 130. For another embodiment, vehicle server 150 can analyze the data to detect a data intrusion and notify secure charging module 124 of vehicle gateway 120 of the detected data intrusion via network 130 for secure charging module 124 of vehicle gateway 120 and/or VCU 106 to perform a correction action.

Figure 4:
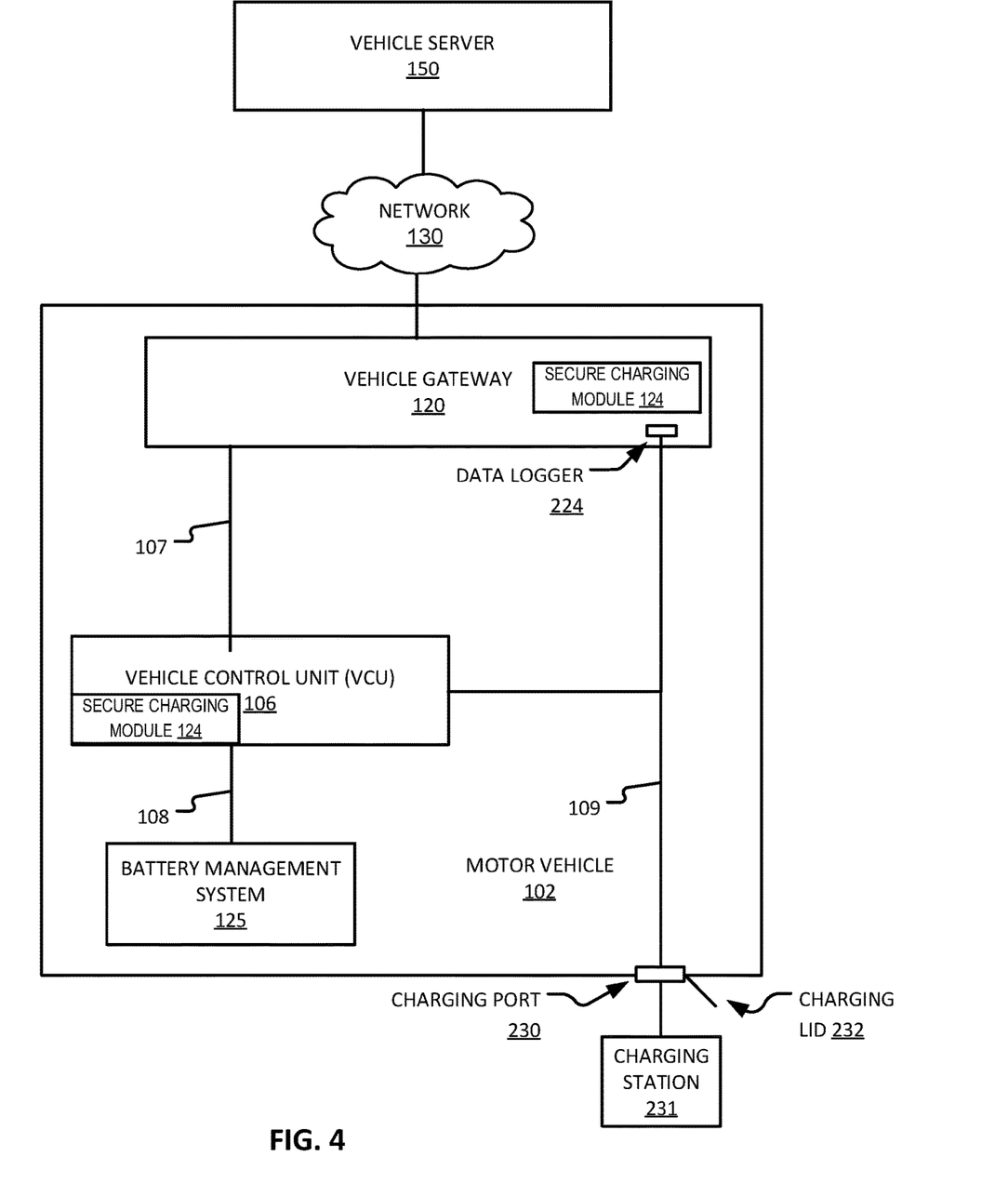
FIG. 4 is block diagram of one embodiment of a motor vehicle in communication with a charger.

FIG. 4 is block diagram of one embodiment of a motor vehicle in communication with a charging station. Referring to FIG. 4, for one embodiment, vehicle gateway 120 can include secure charging module 124 and data logger 224. For one embodiment, data logger 224 and secure charging module 124 can be a single integrated module. For another embodiment, data logger 224 and secure charging module 124 can be separate modules. Communication channel 109 can be in direct connection with vehicle gateway 120 for data logger 224 to directly log any data communicated through communication channel 109. The data may be logged and stored by vehicle gateway 120, such as in a memory or a data store of vehicle gateway 120. Secure charging module 124 of vehicle gateway 120 can monitor and analyze data gathered by data logger 224 to detect a data intrusion. Secure charging module 124 of vehicle gateway 120 and/or VCU 106 can then perform a corrective action upon detection of a data intrusion. For one embodiment, if no data intrusion is detected, secure charging module 124 can provide a secure key to VCU to allow a charging to occur. For another embodiment, a secure key can be a yes or a no message.

For one embodiment, communication channel 109 may be a dedicated communication channel for VCU 106 to communicate a charging stage and/or a battery status of motor vehicle 102 to charging station 231 and/or for charging station 231 to send configuration commands and/or charging parameters to battery management system 125 of motor vehicle 102. For some embodiments, the charging stages and their respective communication messages are known ahead of time by secure module 124 of gateway 120 and/or VCU 106.

For one embodiment, secure charging module 124 of gateway 120 and/or VCU 106 detects a data intrusion by monitoring communication channel 109 for any unexpected messages. Unexpected messages can be data packets that are detected to be outside of the norm. For example, secure charging module 124 can monitor communication channel 109 for incoming and outgoing data packets. Upon detection of a data packet, secure charging module 124 can request for and receive a current charging stage from VCU 106. Based on the current charging stage, secure charging module 124 retrieves a list of expected communication messages for the respective charging stage and performs a comparison analysis for the monitored data packet based on the list of expected communication messages. If the data packet is detected to belong to one of the expected communication messages, no action need to be taken or secure charging module 124 may explicitly send an authorization code (e.g., a secure key) to VCU 106 to authorize a charging. However if the data packet is detected to not belong to one of the expected communication messages of the current charging stage, secure charging module 124 can perform a corrective measure, which may include displaying a warning on user interface 112, sending a charge inhibit message to VCU 106 for VCU 106 to reconfigure BMS 125 (e.g., open or close a charging contact to a battery system) to stop charging, sending a inhibit charging command to charging station 231, and/or stopping/terminating a communication channel/network between the charging station and the vehicle, etc.

For one embodiment, when a data packet is detected to not belong to one of the expected communication messages, secure charging module 124 (and/or VCU 106) can determine whether the data packet and/or a subsequent stream of data packets following the data packet are intrusive or benign. Secure charging module 124 may perform a corrective measure if secure charging module 124 determines that the data packet is intrusive. Secure charging module 124 may display a warning on user interface 112 if secure charging module 124 determines that the data packet is benign.

A data packet may be intrusive if it tries to access data or configure components outside of battery management system 125. For example, an intrusive data packet may be a command to try to configure an operating parameter of component 101, or a command to try to access unauthorized information from subsystems VCU 106 or gateway 120. A data packet may be benign if it has no effect on any subsystems of motor vehicle 102. Here, any number of conditions (intrusive or benign) may be monitored by secure charging module 124, and any corrective action may be taken as a result of a condition being detected.

Table 1 is an example list of charging stages and their respective communication messages from the GB/T 27930-2015 charging standard. However, communication messages from other standards can also be included, such as a US and/or an European DC charging standards. For one embodiment, the charging stages and their respective communication messages can be stored on motor vehicle 102 and/or vehicle server 150. For one embodiment, vehicle server 150 can update the charging stages and their respective messages for motor vehicle 102 by streaming updated charging stages and their respective messages to motor vehicle 102 via network 130.

TABLE 1

| STAGE | Message list |
|---|---|
| [1] Completion of Physical Connection | <none> |
| [2] Auxiliary Charging of low voltage | <none> |
| [3] Charging Handshake | CHM—Charger handshake<br>BHM—Vehicle handshake<br>CRM—Charger recognition<br>BRM—CDI/BMS and vehicle identification message |
| [4] Charging Parameter Configuration | BCP—Charging parameters of power storage battery<br>CTS—Charger send time synchronization information<br>CML—Charger's maximum output capability |

TABLE 1-continued

| STAGE | Message list |
|---|---|
| Stage | BRO—Battery charging ready state<br>CRO—Charger output ready state |
| [5] Charging Stage | BCL—Battery charging demand<br>BCS—overall battery charging status<br>CCS—Charger's charging status<br>BSM—Power storage battery status information<br>BMV—Single power storage battery voltage<br>BMT—temperature of power storage battery<br>BSP—Reserved message of power storage battery<br>BST—CDI/BMS suspending charging<br>CST—Charger suspending charging |
| [6] End of Charging Stage Error messages | BSD—CDI/BMS statistical data<br>CSD—Charger's statistical data<br>BEM—CDI/BMS's error message<br>CEM—Charger's error message |

Figure 5:
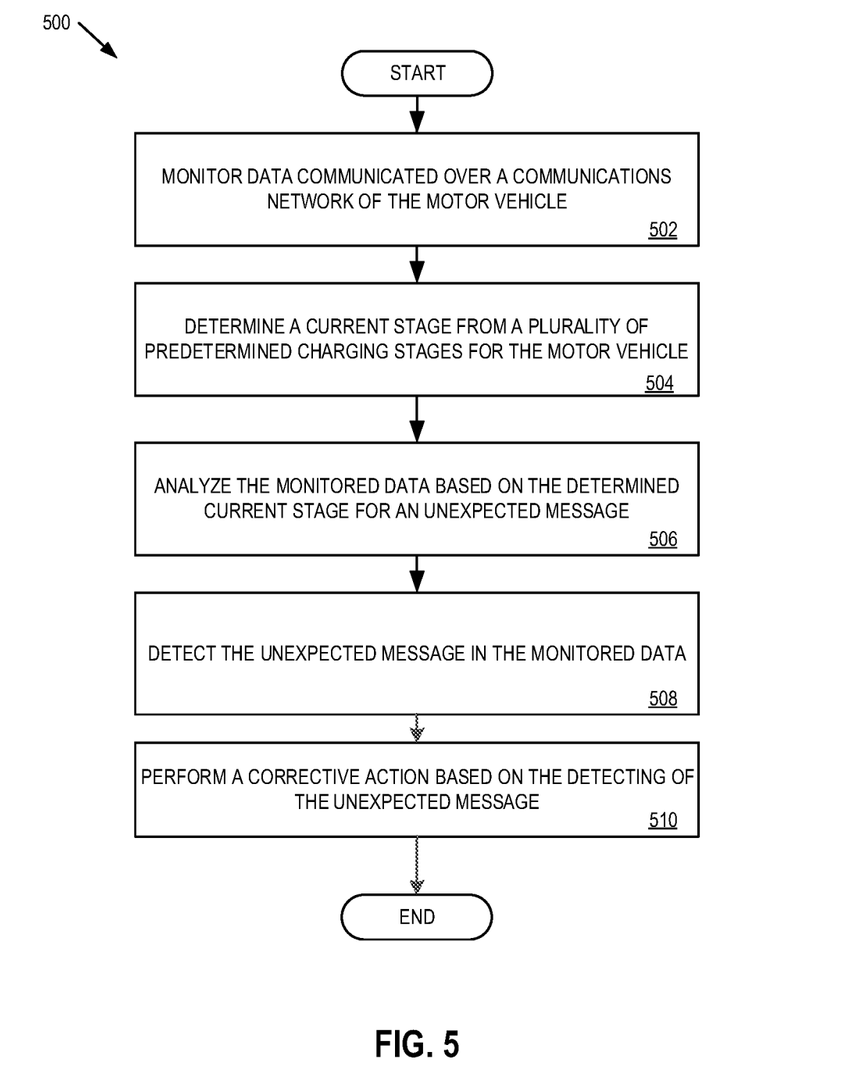
FIG. 5 is a flow diagram of one embodiment for securing a charging for a motor vehicle.

FIG. 5 is a flow diagram of one embodiment of a method for enforcing a safe and/or secure charging for a motor vehicle. Method 500 is performed by processing logic that may comprise hardware (circuitry, dedicated logic, etc.), software (such as is run on a general purpose computer system or a dedicated machine), firmware, or a combination. For one embodiment, method 500 is performed by a secure charging module (e.g., secure charging module 124) of a vehicle gateway of a motor vehicle.

Referring to FIG. 5, at processing block 502, processing logic monitors data communicated over a communications network of the motor vehicle. For some embodiments, the data may be communicated between a charging station and the motor vehicle (e.g., via communication network 109). Furthermore, the communications network of the motor vehicle may include: a CAN bus, an Ethernet network, a wireless network, or any combination of networks.

At processing block 504, processing logic determines a current charging stage from a number of predetermined charging stages for the motor vehicle. At processing block 506, processing logic analyzes the monitored data based on the determined current charging stage for an unexpected message. At processing block 508, processing logic detects the unexpected message in the monitored data. At processing block 510, processing logic performs a corrective action based on the detecting of the unexpected message.

For one embodiment, processing logic detects an unlocking of a mechanical charging lid prior to monitoring the data. For one embodiment, mechanical charging lid is unlocked via an authorized entry using a wireless keyless entry device associated with the motor vehicle.

For one embodiment, processing logic detects an established connection for the communication network (e.g., communications network 109 of FIGS. 3-4) prior to monitoring the data communicated over the communications network of the motor vehicle. For one embodiment, the predetermined charging stages include one of the following: a completion of physical connection stage, an auxiliary charging of low voltage stage, a charging handshake stage, a charging parameter configuration stage, a charging parameter configuration stage, a charging stage, an end-of-charging stage, and a charging terminates stage. For one embodiment, each of the charging stages is associated with a list of predetermined messages as expected data.

For one embodiment, performing a corrective action based on detection of the unexpected data includes sending a charging inhibit message to a vehicle control unit of the motor vehicle which prevents or stops a current charging. For one embodiment, performing a corrective action based on detection of the unexpected data includes sending a charging inhibit message to a charging station over the communication network to which prevents or stops a current charging. For one embodiment, performing a corrective action based on detection of the unexpected data includes stopping/terminating a communication channel of the communications network between the charging station and the vehicle.

For some embodiments, a vehicle gateway enforces a safe and secure charging of a motor vehicle, the vehicle gateway includes a memory, one or more processors communicably coupled with the memory, the one or more processors is configured to perform operations including: monitoring data communicated over a communications network of the motor vehicle, determining a current charging stage from a plurality of predetermined charging stages for the motor vehicle, analyzing the monitored data based on the determined current charging stage for unexpected data, detecting the unexpected message in the monitored data, and performing a corrective action based on detection of the unexpected data.

For some embodiments, a motor vehicle includes a battery management system, a vehicle control unit (VCU) communicatively coupled to the battery management system to open or close a charging contact within the battery management system, and a vehicle gateway communicatively coupled to the VCU. The vehicle gateway enforces a safe and secure charging of the motor vehicle, the vehicle gateway includes a memory, one or more processors communicably coupled with the memory, the one or more processors is configured to perform operations including: monitoring data communicated over a communications network of the motor vehicle, determining a current charging stage from a plurality of predetermined charging stages for the motor vehicle, analyzing the monitored data based on the determined current charging stage for unexpected data, detecting the unexpected message in the monitored data, and performing a corrective action based on detection of the unexpected data.

For one embodiment, the vehicle gateway is communicatively coupled to the charging station during a charging session to directly monitor the communicated data over the communications network.

The embodiments as will be hereinafter described may be implemented through the execution of instructions, for example as stored in memory or other element, by processor(s) and/or other circuitry of motor vehicle 102. Particularly, circuitry of motor vehicle 102, including but not limited to processor(s) 212 may operate under the control of a program, routine, or the execution of instructions to execute methods or processes in accordance with the aspects and features described herein. For example, such a program may be implemented in firmware or software (e.g. stored in memory 205) and may be implemented by processors, such as processor(s) 212, and/or other circuitry. Further, the terms processor, microprocessor, circuitry, controller, etc., may refer to any type of logic or circuitry capable of executing logic, commands, instructions, software, firmware, functionality and the like.

Further, some or all of the functions, engines, or modules described herein may be performed by motor vehicle 102 itself and/or some or all of the functions, engines or modules described herein may be performed by another system connected through network interface 204 to motor vehicle 102. Thus, some and/or all of the functions may be performed by another system, and the results or intermediate calculations may be transferred back to motor vehicle 102.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in various ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

For one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable one to make or use the methods, systems, and apparatus of the present disclosure. Various modifications to these embodiments will be readily apparent, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A vehicle gateway for enforcing a safe and secure charging of a vehicle, the vehicle gateway comprising:
a memory; and
one or more processors communicably coupled with the memory, the one or more
processors are configured to perform operations, the operations comprising:
monitoring data communicated between the vehicle and a vehicle charging station over a communications network of the vehicle;
determining a current charging stage from a plurality of predetermined charging stages for the vehicle;
determining expected communication data based on the current charging stage;
analyzing the monitored data based on the determined current charging stage for unexpected data, wherein the unexpected data include intrusive communication data different from the expected communication data;
detecting the unexpected data in the monitored data; and
performing a corrective action based on detection of the unexpected data
wherein the one or more processors are further configured to detect an unlocking of a mechanical charging lid prior to monitoring the data, and wherein the plurality of predetermined charging stages include one of the following: a completion of physical connection stage, an auxiliary charging of low voltage stage, a charging handshake stage, a charging parameter configuration stage, a charging stage, an end-of-charging stage, and a charging termination stage.

2. The vehicle gateway of claim 1, wherein the mechanical charging lid is unlocked via an authorized entry using a wireless keyless entry device associated with the vehicle.

3. The vehicle gateway of claim 1, wherein the one or more processors are further configured to detect an established connection for the communications network prior to monitoring the data communicated over the communications network of the vehicle.

4. The vehicle gateway of claim 1, wherein each of the charging stages is associated with a list of predetermined messages as expected data.

5. The vehicle gateway of claim 1, wherein performing a corrective action based on detection of the unexpected data includes sending a charging inhibit message to a vehicle control unit of the vehicle or the charging station over the communications network to prevent or stop a current charging.

6. The vehicle gateway of claim 1, wherein performing a corrective action based on detection of the unexpected data includes terminating a communication channel of the communications network between the charging station and the vehicle.

7. A vehicle comprising:
a battery management system;
a vehicle control unit (VCU) communicatively coupled to the battery management system to open or close a charging contact within the battery management system; and
a vehicle gateway communicatively coupled to the VCU, wherein the vehicle gateway comprising:
a memory; and
one or more processors communicably coupled with the memory, the one or more processors are configured to perform operations, the operations comprising:
monitoring, by a vehicle gateway, data communicated between the vehicle and a vehicle charging station over a communications network of the vehicle, wherein the vehicle gateway is situated within the vehicle;
determining a current charging stage from a plurality of predetermined charging stages for the vehicle;
determining expected communication data based on the current charging stage;
analyzing the monitored data based on the determined current charging stage for unexpected data, wherein the unexpected data include intrusive communication data different from the expected communication data;
detecting the unexpected data in the monitored data; and
performing a corrective action based on detection of the unexpected data,
wherein the one or more processors are further configured to detect an unlocking of a mechanical charging lid prior to monitoring the data, and wherein the plurality of predetermined charging stages include one of the following: a completion of physical connection stage, an auxiliary charging of low voltage stage, a charging handshake stage, a charging parameter configuration stage, a charging stage, an end-of-charging stage, and a charging termination stage.

8. The vehicle of claim 7, wherein the vehicle gateway is further communicatively coupled to the charging station during a charging session to directly monitor the communicated data over the communications network.

9. The vehicle of claim 7, wherein the mechanical charging lid is unlocked via an authorized entry using a wireless keyless entry device associated with the vehicle.

10. The vehicle of claim 7, wherein the vehicle gateway includes a hardened hardware appliance having a physical or a logical barrier to prevent unauthorized access to the vehicle gateway.

11. A method performed by a vehicle for enforcing a secure charging of the vehicle, the method comprising:
monitoring data communicated between the vehicle and a vehicle charging station over a communications network of the vehicle;

determining a current charging stage from a plurality of predetermined charging stages for the motor vehicle;

determining expected messages based on the current charging stage;

analyzing the monitored data based on the determined current charging stage for an unexpected message, wherein the unexpected message includes an intrusive communication message different from the expected messages;

detecting the unexpected message in the monitored data; and performing a corrective action based on the detecting of the unexpected message, wherein the one or more processors are further configured to detect an unlocking of a mechanical charging lid prior to monitoring the data, and wherein the plurality of predetermined charging stages include one of the following: a completion of physical connection stage, an auxiliary charging of low voltage stage, a charging handshake stage, a charging parameter configuration stage, a charging stage, an end-of-charging stage, and a charging termination stage.

12. The method of claim 11, wherein the mechanical charging lid is unlocked via an authorized entry using a wireless keyless entry device associated with the vehicle.

13. The method of claim 11, further comprising detecting an established connection for the communications network prior to monitoring the data communicated over the communications network of the vehicle.

14. The method of claim 11, wherein each of the charging stages is associated with a list of predetermined messages as expected messages.

15. The method of claim 11, wherein performing a corrective action based on detection of the unexpected message includes sending a charging inhibit message to a vehicle control unit of the vehicle or the charging station over the communications network to prevent or stop a current charging.

16. The method of claim 11, wherein performing a corrective action based on detection of the unexpected message includes terminating a communication channel of the communications network between the charging station and the vehicle.

* * * * *